United States Patent
Holpp et al.

(12) 
(10) Patent No.: US 6,368,726 B1
(45) Date of Patent: Apr. 9, 2002

(54) HONEYCOMB BODY CONFIGURATION

(75) Inventors: Helmut Holpp, Siegburg; Uwe Siepmann, Köln, both of (DE)

(73) Assignee: Emitec Gesellschaft für Emissionionstechnologie MBH, Lohmar (DE)

( * ) Notice: Subject to any disclaimer, the term of this patent is extended or adjusted under 35 U.S.C. 154(b) by 0 days.

(21) Appl. No.: 09/730,267

(22) Filed: Dec. 5, 2000

Related U.S. Application Data

(63) Continuation of application No. PCT/EP99/03711, filed on May 28, 1999.

(30) Foreign Application Priority Data

Jun. 5, 1998 (DE) .......................................... 198 25 230

(51) Int. Cl.$^7$ .............................. B01J 35/04; F01N 3/28
(52) U.S. Cl. ...................... 428/593; 428/603; 228/181; 29/890; 422/180; 502/439; 502/527.22
(58) Field of Search ................................. 428/593, 603, 428/594; 228/181; 29/890; 502/439, 527.22; 422/180

(56) References Cited

U.S. PATENT DOCUMENTS

| | | | | | |
|---|---|---|---|---|---|
| 4,795,615 A | * | 1/1989 | Cyron et al. | ................ | 422/180 |
| 4,847,966 A | * | 7/1989 | Kuchelmeister | .......... | 29/157 R |
| 4,948,774 A | * | 8/1990 | Usui et al. | ................... | 502/439 |
| 5,002,923 A | * | 3/1991 | Koshiba et al. | ............. | 502/439 |
| 5,026,611 A | * | 6/1991 | Usui et al. | ................... | 428/593 |
| 5,084,361 A | * | 1/1992 | Toyoda et al. | .............. | 428/593 |
| 5,272,875 A | * | 12/1993 | Kaji | ........................... | 422/180 |
| 5,346,675 A | * | 9/1994 | Usui et al. | ................... | 422/180 |
| 5,916,530 A | * | 6/1999 | Maus et al. | .................. | 422/180 |

FOREIGN PATENT DOCUMENTS

| | | | |
|---|---|---|---|
| DE | 2300704 | * | 7/1974 |
| DE | 292784 | * | 5/1988 |
| DE | 3926072 A1 | * | 2/1991 |

* cited by examiner

*Primary Examiner*—John J. Zimmerman
(74) *Attorney, Agent, or Firm*—Herbert L. Lerner; Laurence A. Greenberg; Werner H. Stemer

(57) ABSTRACT

A honeycomb body configuration includes a honeycomb body with a fluid inlet side and a fluid outlet side. The honeycomb body is formed of at least partially structured sheet metal layers which form channels through which a fluid can flow. The honeycomb body is surrounded by an inner tubular jacket and an outer tubular jacket provided concentrically in relation thereto. The inner tubular jacket is configured as a corrugated hose in at least one axial subregion thereof. The inner tubular jacket has at least one further axial subregion which lies smoothly against the honeycomb body. The corrugated subregion and the outer tubular jacket are connected at least in a longitudinal partial region of the corrugated subregion.

41 Claims, 3 Drawing Sheets

HONEYCOMB BODY CONFIGURATION

CROSS-REFERENCE TO RELATED APPLICATION

This application is a continuation of copending International Application No. PCT/EP99/03711, filed May 28, 1999, which designated the United States.

BACKGROUND OF THE INVENTION

Field of the Invention

The invention relates to a honeycomb body configuration including a honeycomb body having a fluid inlet side and a fluid outlet side, in particular a catalyst support structure for motor vehicles, formed of at least partially structured layers of sheet metal which, after being stacked and/or wound, form channels through which a fluid can flow. The honeycomb body is surrounded by an inner tubular jacket and an outer tubular jacket provided concentrically thereto. At least an axial subregion of the inner tubular jacket is configured as a corrugated tube.

Honeycomb body configurations of this type are known per se. Published, Non-Prosecuted German Patent Application No. DE 2 300 704 describes, for example, ceramic honeycomb bodies having a metallic layer on their surface. Connected to this layer are elastic elements which, for their part, are mounted in turn in the outer tubular jacket. The elastic holding elements are, in particular, sections of corrugated tube which are intended to absorb the thermally induced relative movements between the honeycomb body and the outer tubular jacket. The elastic elements are provided either in two parts, in each case on the fluid inlet side and fluid outlet side, or in one part, over the overall length of the honeycomb body, and each have a flange for connection to a pipeline.

Also for metallic honeycomb bodies which are constructed of layers of sheet metal it is known, for example from Published, Non-Prosecuted German Patent Application DE 39 41 642 A1, for the purpose of preventing stresses due to thermal expansion, to surround layers of sheet metal with an outer metal tubular jacket having short corrugations at a short distance apart, with the result that a honeycomb body having an outer tubular jacket of this type is able to expand and shrink.

In the case of honeycomb body configurations having an inner and an outer tubular jacket which, at least in subregions, are intended to be displaceable relative to each other, there are also a large number of problems involving the manufacture because particularly when brazing or welding connections it has to be ensured in each case that undesirable additional connections between the two tubular jackets do not obstruct the mutual displaceability.

SUMMARY OF THE INVENTION

It is accordingly an object of the invention to provide a honeycomb body configuration which overcomes the above-mentioned disadvantages of the heretofore-known configurations of this general type and which can be produced in a reproducible manner with uniform quality and ensures, by providing a good equalization of mechanical and thermal loads, a permanent and secure mounting of a honeycomb body constructed from layers of sheet metal in a metallic housing, even under special operating loads. It is a further object of the invention to achieve a good cold-starting performance of a catalytic exhaust gas cleaning device having the honeycomb body configuration according to the invention.

With the foregoing and other objects in view there is provided, in accordance with the invention, a honeycomb body configuration, including:

a honeycomb body formed of at least partially structured sheet metal layers, the at least partially structured sheet metal layers being stacked sheet metal layers and/or wound sheet metal layers and defining channels for a fluid to flow therethrough, the honeycomb body having a fluid inlet side and a fluid outlet side;

an inner tubular jacket surrounding the honeycomb body;

an outer tubular jacket provided concentrically with respect to the inner tubular jacket and surrounding the honeycomb body;

the inner tubular jacket having a first longitudinal subregion and at least a second longitudinal subregion, the first longitudinal subregion having a first length including a first partial length, the second longitudinal subregion having a second length including a second partial length;

the inner tubular jacket being configured, in the first longitudinal subregion, as a corrugated tube having tubular corrugations such that the first longitudinal subregion is a corrugated subregion;

the second longitudinal subregion being a smooth subregion bearing flat against the honeycomb body;

the smooth subregion and the honeycomb body being joined at least at the second partial length; and several of the tubular corrugations provided next to one another and the outer tubular jacket being joined at the first partial length, the first partial length being dimensioned for a conventional joining connection.

In other words, the honeycomb body configuration according to the invention includes a honeycomb body having a fluid inlet side and a fluid outlet side, in particular a catalyst support structure for motor vehicles, formed of at least partially structured layers of sheet metal which, after being laminated and/or wound, form channels through which a fluid can flow, the honeycomb body being surrounded by an inner tubular jacket and an outer tubular jacket provided concentrically thereto, and at least an axial subregion of the inner tubular jacket being configured as a flexible corrugated tube, having tubular corrugations, the inner tubular jacket having at least one further axial subregion which bears smoothly against the honeycomb body, and the smooth subregion and the honeycomb body being at least partially connected axially to each other by a join, a plurality of tubular corrugations provided next to one another of the corrugated subregion and the outer tubular jacket are partially connected axially to one another by a join, each corrugated subregion provided for connection to the outer tubular jacket by a join being dimensioned in its partial length such that conventional connecting methods, in particular soldering and/or welding processes, can be used.

Mechanical and thermal loads can be equally well equalized and a permanent and secure mounting configuration of the honeycomb body in the housing ensured in an advantageous manner by the inner tubular jacket of the honeycomb body having, in addition to an axial or longitudinal subregion configured as a flexible corrugated tube, having tubular corrugations, at least one further axial or longitudinal subregion which bears smoothly (flat) against the honeycomb body, and by a plurality of tubular corrugations provided next to one another of the corrugated subregion and the outer tubular jacket being partially connected to each other axially by a join, and by the smooth subregion and the honeycomb body being at least partially connected to each other axially by a join. According to the invention, each corrugated subregion provided for connection to the outer tubular jacket by a join is dimensioned in its partial length in such a manner that conventional connecting methods, in particular brazing and/or welding processes, can easily be used.

According to the invention, the honeycomb body configuration is preferably distinguished in that first of all a smooth subregion is provided on the fluid inlet side, followed by at least one corrugated subregion and at least one further smooth subregion, thereby resulting in a total of n corrugated subregions and n+1 smooth subregions, n being an integer and being greater than or equal to 1. By providing, on the fluid inlet side, a smooth subregion acting as an air-gap insulation, rapid starting of the catalytic reaction when beginning to be subjected to exhaust gas to be cleaned is ensured in an advantageous manner. As an alternative to the air-gap insulation, the thermal insulation can also be improved through the use of an insulating mat, for example made of ceramic material, which has very low heat-conducting and heat-convection properties.

In one particular embodiment, where n=1, the one corrugated subregion is predominantly provided on the fluid inlet side. As a result, the smooth section of the inner tubular jacket on the inlet side is only short, for example 5 to 25 mm, and in particular the mechanical loads on the fluid inlet side which are caused by exhaust gas strongly pulsating from time to time are absorbed in an advantageous manner.

Alternatively, in another embodiment, for n=1, the one corrugated subregion can be provided centrally axially, i.e. essentially in the center of the honeycomb body, as seen in the axial direction. This has the advantage of not having to pay attention to the installation direction during assembly.

Alternatively, for n=1, the one corrugated subregion can also be predominantly provided on the fluid outlet side, in particular if a long, smooth, first subregion is desired in order to obtain a large volume, insulated from the outer tubular jacket, in the honeycomb body.

For n=2, one corrugated subregion is provided behind a smooth subregion on the fluid inlet side and another corrugated subregion is provided in front of a smooth subregion on the fluid outlet side. A mounting configuration of this type on both sides, i.e. on the fluid inlet side and fluid outlet side, of the honeycomb body in the outer tubular jacket is particularly advantageous in terms of equalizing mechanical loads and has the effect of the honeycomb body being supported in a manner which is very insensitive to vibrations.

For n=3, the first corrugated subregion is provided on the fluid inlet side, the second corrugated subregion is provided centrally axially, and the third corrugated subregion is provided on the fluid outlet side, in each case alternating with smooth subregions. A configuration of this type combines the advantages which have already been demonstrated even in honeycomb body configurations subjected to extreme loading, for example ones installed near to the engine. For n greater than 3, the corrugated and smooth subregions are provided analogously to the previous configurations.

According to another feature of the invention, in the case of a central axial configuration of one corrugated subregion, only this corrugated subregion is partially connected axially to the outer tubular jacket by a join.

According to yet another feature of the invention, in the case of a central axial configuration of one corrugated subregion, the smooth subregions in each case provided adjacently, or the smooth subregions in each case provided on the fluid inlet side and the fluid outlet side are at least partially connected axially to the honeycomb by a join.

According to another feature of the invention, in the case of a predominantly or exclusively decentralized axial configuration of the corrugated subregion/subregions, the latter is/are partially connected axially to the outer tubular jacket by a join only on the fluid inlet side and/or on the fluid outlet side.

According to a further feature of the invention, in the case of a predominantly or exclusively decentralized axial configuration of the corrugated subregion/subregions, the smooth subregion/subregions which is/are provided centrally axially, on the fluid inlet side or on the fluid outlet side, is/are at least partially connected axially to the honeycomb by a join.

According to yet another feature of the invention, each smooth subregion provided for a connection to the honeycomb by a join is dimensioned in its partial length in such a manner that conventional connecting methods, in particular brazing and/or welding processes, can be used.

To obtain a durable connection, the inner tubular jacket has to be connected to the honeycomb body at least in one region and to the outer tubular jacket in one region. It is preferred if all smooth subregions are at least partially connected, in particular brazed or hard-soldered, to the honeycomb body. In addition, it is preferred if all corrugated subregions are connected, preferably likewise brazed or hard-soldered or welded, to the outer tubular jacket. In this configuration, however, it is important not to connect all of the crests of the corrugations to the outer tubular jacket, since otherwise the effect of the corrugations as a compensator for expansion would be obstructed. At least some of the crests of the corrugations are to remain unconnected, in particular two crests of the corrugations which are adjacent on both sides to a smooth subregion of the inner tubular jacket are not to be connected to the outer tubular jacket.

In a preferred embodiment, the sum of the axial lengths of the corrugated subregions amounts to more than half, preferably to more than two thirds, of the overall length of the honeycomb body. This advantageously facilitates the equalizing of mechanical loads, in particular.

In one particular embodiment, the tubular corrugations of the corrugated subregions have, viewed over their longitudinal axial section, very steep flank regions, in particular even an omega shape. Such a refinement of the tubular corrugations ensures, in each case depending on the thermal load, load-adapted expansion and shrinking of the inner tubular jacket.

Irrespective of their remaining shape, the tubular corrugations are preferably of flattened configuration in the region of their connection to the outer tubular jacket by a join. Flattened regions of this type enable a flat connection which withstands high mechanical and thermal loads.

The partial connection between a corrugated subregion and the outer tubular jacket by a join therefore extends in each case over 1 to 5, preferably over 2 to 4, in particular over 3, crests of the tubular corrugation of the corrugated subregion, with the result that the connections can be produced permanently and securely by the manufacturing process in accordance with their use.

According to the invention, the ratio of tubular corrugations connected by a join to tubular corrugations not connected by a join is preferably at most 1:1.5, preferably 1:4, so that equalization in particular of mechanical loads is ensured.

The first smooth subregion provided on the fluid inlet side is at least 5 mm long, preferably at least 7.5 mm, in particular approximately 10 mm, the other smooth subregions are at least 15 mm long, preferably at least 20 mm, in particular approximately 25 mm.

The honeycomb body, which is, in particular, a catalyst support structure through which a flow can take place axially, can have any desired geometrical, preferably a cylindrical or a conical, shape.

Other features which are considered as characteristic for the invention are set forth in the appended claims.

Although the invention is illustrated and described herein as embodied in a honeycomb body configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
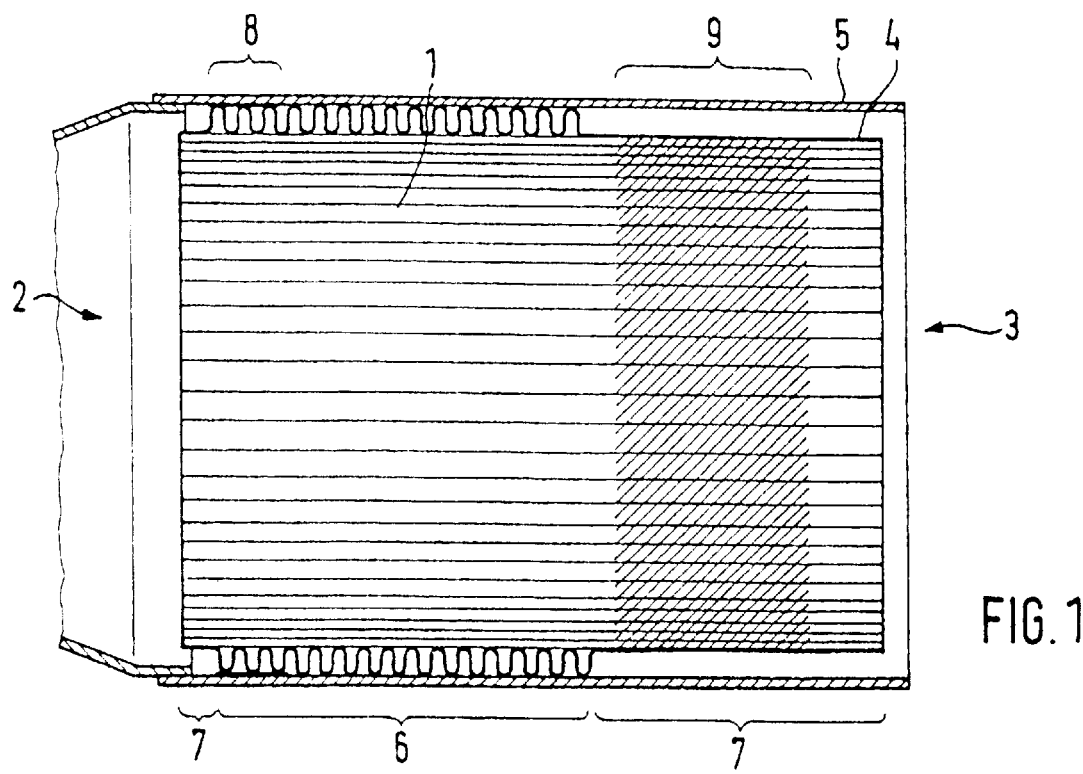
FIGS. 1 to 4 are partial, longitudinal sectional views of preferred exemplary embodiments of a honeycomb body configuration according to the invention with a cylindrical honeycomb body.

Referring now to the figures of the drawings in detail and first, particularly, to FIG. 1 thereof, there is shown a partial longitudinal axial section of a first exemplary embodiment of a honeycomb body configuration, including a cylindrical or oval honeycomb body 1, in particular configured as a catalyst support structure for motor vehicles with a catalytically active coating, having a fluid inlet side 2 and a fluid outlet side 3, constructed from at least partially structured layers of sheet metal which, after being stacked and/or wound, form channels through which a fluid can flow, the honeycomb body 1 being surrounded by an inner tubular jacket 4 and an outer tubular jacket 5 which is provided concentrically thereto. First of all a smooth subregion 7 is provided on the fluid inlet side 2, followed by a corrugated subregion 6 and a further smooth subregion 7. The first smooth subregion 7 has a length of approximately 5 mm and is thus clearly shorter than the next subregion. The corrugated subregion 6 which is predominantly provided on the fluid inlet side is brazed on the fluid inlet side 2 partially axially over a length 8 of, for example, three tubular corrugations, to the outer tubular jacket 5. The honeycomb body 1 is brazed on the fluid outlet side 3 partially axially over a length 9 of approximately 25 mm to the longer, second smooth subregion 7. A honeycomb body configuration of this type having a honeycomb body 1 of conventional constructional length of approximately 100 to 150 mm equalizes mechanical loads particularly well because of the corrugated subregion 6 provided predominantly on the fluid inlet side 2.

Figure 2:
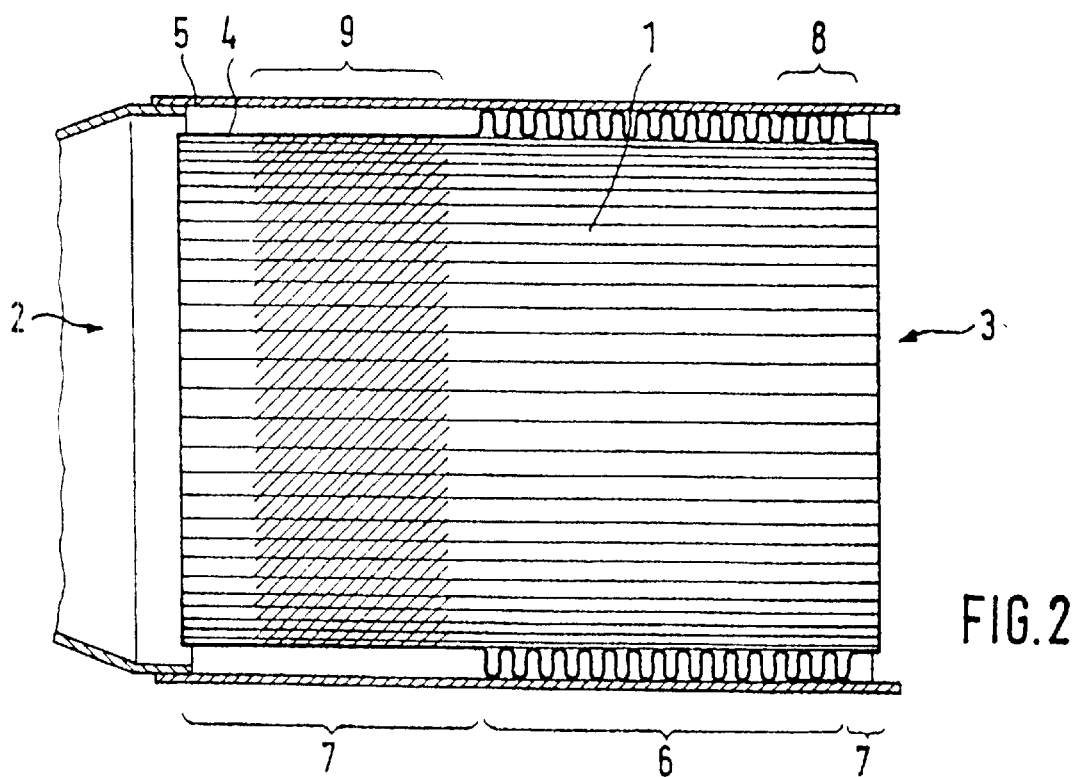

FIG. 2 shows, in a partial longitudinal axial section, a second exemplary embodiment of a honeycomb body configuration with a cylindrical or oval honeycomb body 1. First of all a smooth subregion 7 is provided on the fluid inlet side 2, followed by a corrugated subregion 6 and a further smooth subregion 7. In contrast to the honeycomb body configuration according to FIG. 1, the first smooth subregion 7 is clearly longer than the second, which only has a length of approximately 5 mm. The corrugated subregion 6, which is predominantly provided on the fluid outlet side 3, is brazed on the fluid outlet side partially axially over a length 8 of three tubular corrugations to the outer tubular jacket 5. The honeycomb body 1 is brazed on the fluid inlet side 2 partially axially over a length 9 of, for example, approximately 25 mm, to the longer, first, smooth subregion 7. A honeycomb body configuration of this type with a honeycomb body 1 of usual constructional length of approximately 100 to 150 mm assists, because of the longer, first smooth subregion 7 which is on the fluid inlet side and is insulated thermally from the outer tubular jacket 5, particularly well in the catalyst support structure rapidly responding when subjected to exhaust gas from an engine in the cold-starting phase.

Figure 3:
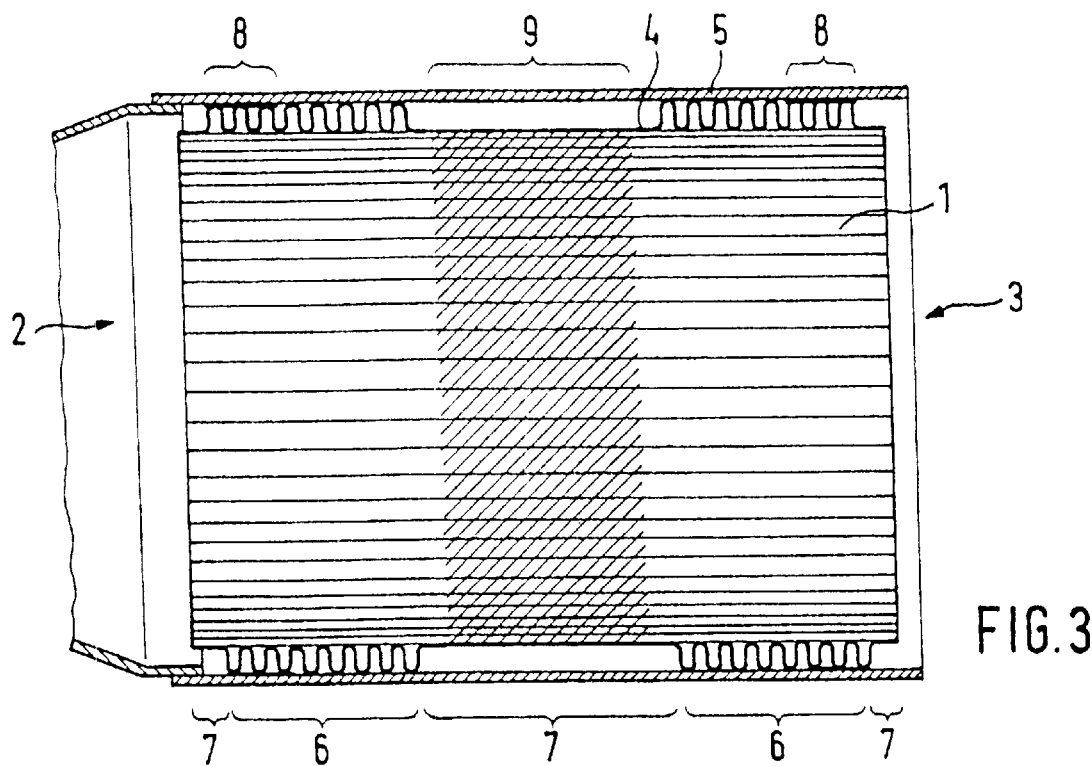

FIG. 3 shows, partially in section, a third exemplary embodiment of a honeycomb body configuration with a honeycomb body 1. First of all a smooth subregion 7 is provided on the fluid inlet side 2, followed by a corrugated subregion 6, a second smooth subregion 7, a second corrugated subregion 6 and finally a third smooth subregion 6. The smooth subregions 7 on the fluid inlet side and fluid outlet side each have a length of approximately 5 mm and are therefore clearly shorter than the central smooth subregion 7 provided centrally axially. The honeycomb body 1 is brazed partially axially over a length 9 of 25 mm to the long, smooth subregion 7 provided centrally axially. The corrugated subregions 6, which are provided on the fluid inlet side and fluid outlet side, are brazed partially axially in each case over a length 8 of, for example, three tubular corrugations, to the outer tubular jacket 5. A honeycomb body configuration of this type with two corrugated subregions 6 provided on the fluid inlet side 2 and fluid outlet side 3 equalizes mechanical loads particularly well, in particular for honeycomb bodies 1 having a greater constructional length of more than 150 mm.

Figure 4:
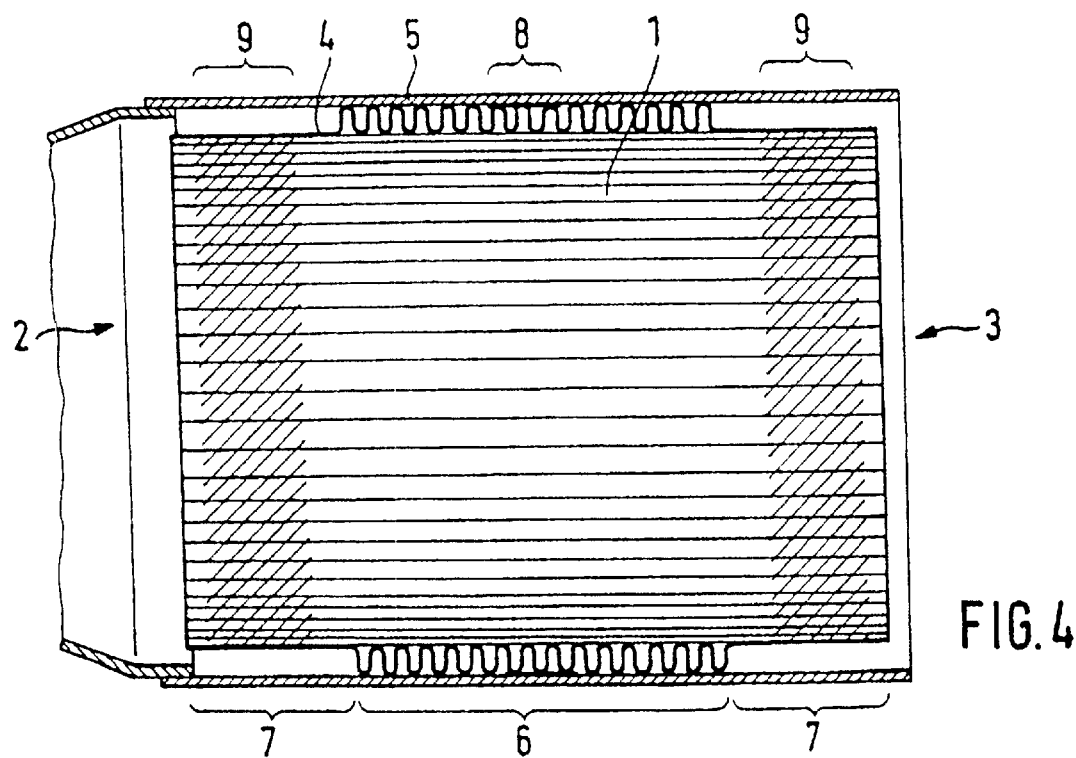

FIG. 4 shows, in a partial longitudinal axial sectional view, a fourth exemplary embodiment of a honeycomb body configuration with a cylindrical honeycomb body 1. First of all a smooth subregion 7 is provided on the fluid inlet side 2, followed by a corrugated subregion 6 and a further smooth subregion 7. The smooth subregions 7 on the fluid inlet side and fluid outlet side are clearly longer than the corresponding smooth subregions 7 according to FIG. 3. The honeycomb body 1 is brazed partially axially on the fluid inlet side and fluid outlet side in each case over a length 9 of, for example, 15 mm, to the smooth subregions 7. The corrugated subregion 6, which is provided centrally axially, is brazed partially axially over a length 8 of, for example, three tubular corrugations, to the outer tubular jacket 5. A honeycomb body configuration of this type with a honeycomb body 1 of an increased constructional length of more than 150 mm, on the one hand, equalizes mechanical loads particularly well because of the corrugated subregion 6 provided centrally axially and, on the other hand, assists in an immediate restarting of the catalyst support structure because of the longer first smooth subregion 7 which is on the fluid inlet side and is thermally insulated.

Figure 5:
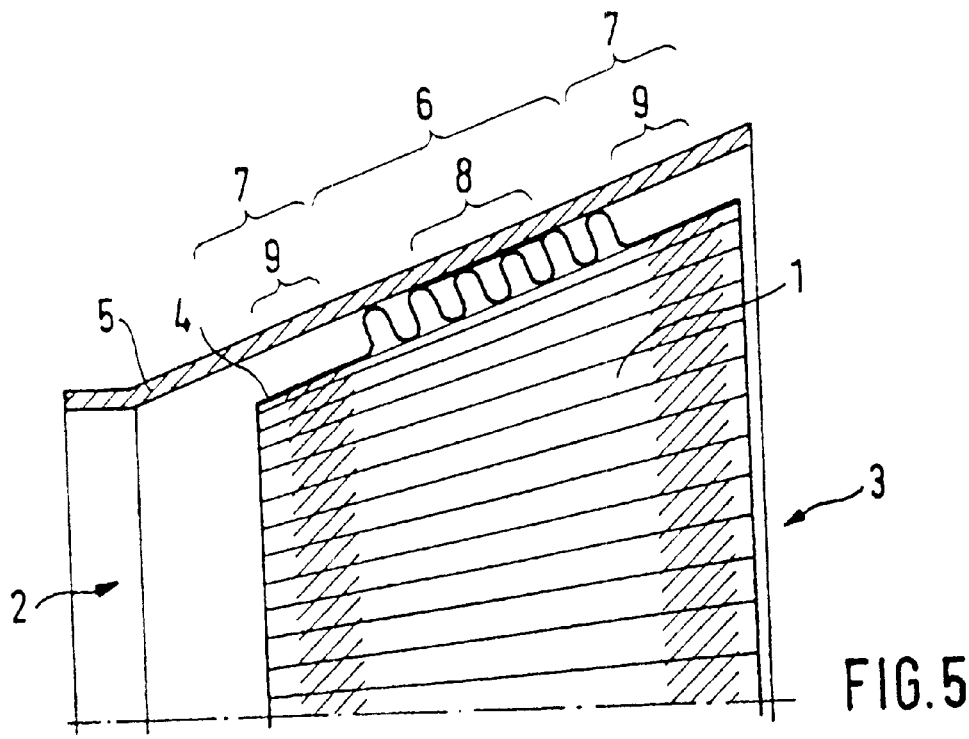
FIG. 5 is a partial, longitudinal sectional view of a further exemplary embodiment of a honeycomb body configuration with a conical honeycomb body.

FIG. 5 shows, in a partial sectional view, an exemplary embodiment of a honeycomb body configuration as in FIG. 4, but for a conical honeycomb body. The additional use of conical honeycomb bodies 1 enables, while retaining the demonstrated advantages of the invention, the construction of comparatively compact exhaust gas cleaning systems with very good distributions of flow and particularly good cold-starting performance.

Figure 6:
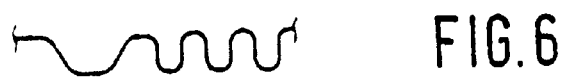
FIGS. 6 and 7 are diagrammatic sectional views of enlarged details of alternative shapes for the tubular corrugation of a corrugated subregion according to FIGS. 1 to 5.
Figure 7:

In preferred embodiments of the invention, the tubular corrugations of the corrugated subregions 6 have, viewed over their longitudinal axial section, very steep flank regions, in particular even an omega shape. FIGS. 6 and 7 show details of alternative tubular corrugations having flattened, in particular trapezoidal, flank regions which, in the partial axial region 8 of the brazing to the outer tubular jacket 5, have the advantage of a more permanent connection by a join than in the case of omega-shaped tubular corrugations.

The invention allows a reliable manufacturing of honeycomb body configurations which can withstand particularly high loads and which have a good cold-starting performance in the exhaust gas cleaning system of a motor vehicle.

We claim:

1. A honeycomb body configuration, comprising:
   a honeycomb body formed of at least partially structured sheet metal layers, said at least partially structured sheet metal layers being at least one of stacked sheet metal layers and wound sheet metal layers and defining channels for a fluid to flow therethrough, said honeycomb body having a fluid inlet side and a fluid outlet side;
   an inner tubular jacket surrounding said honeycomb body;
   an outer tubular jacket provided concentrically with respect to said inner tubular jacket and surrounding said honeycomb body;
   said inner tubular jacket having a first longitudinal subregion and at least a second longitudinal subregion, said first longitudinal subregion having a first length including a first partial length, said second longitudinal subregion having a second length including a second partial length;
   said inner tubular jacket being configured, in said first longitudinal subregion, as a corrugated tube having tubular corrugations such that said first longitudinal subregion is a corrugated subregion;
   said second longitudinal subregion being a smooth subregion bearing flat against said honeycomb body;
   said smooth subregion and said honeycomb body being joined at least at said second partial length; and
   several of said tubular corrugations provided next to one another and said outer tubular jacket being joined at said first partial length, said first partial length being dimensioned for a joining connection.

2. The honeycomb body configuration according to claim 1, wherein said first partial length is dimensioned for at least one connection selected from the group consisting of a brazed connection and a welded connection.

3. The honeycomb body configuration according to claim 1, wherein said honeycomb body is a catalyst support structure for a motor vehicle.

4. The honeycomb body configuration according to claim 1, wherein said smooth subregion is provided on said fluid inlet side followed by at least said corrugated subregion and at least one further smooth subregion, such that a total of n corrugated subregions and n+1 smooth subregions are provided, n being an integer number and $n \geq 1$.

5. The honeycomb body configuration according to claim 1, wherein said corrugated subregion is predominantly provided on said fluid inlet side.

6. The honeycomb body configuration according to claim 4, wherein said corrugated subregion is predominantly provided on said fluid inlet side for n=1.

7. The honeycomb body configuration according to claim 4, wherein:
   said inner tubular jacket has a longitudinal extension; and
   said corrugated subregion is provided centrally with respect to said longitudinal extension for n=1.

8. The honeycomb body configuration according to claim 4, wherein said corrugated subregion is predominantly provided on said fluid outlet side for n=1.

9. The honeycomb body configuration according to claim 4, wherein, for n=2, a first one of said corrugated subregions is provided on said fluid inlet side and a second one of said corrugated subregions is provided on said fluid outlet side.

10. The honeycomb body configuration according to claim 4, wherein, for n=3, a first one of said corrugated subregions is provided on said fluid inlet side, said inner tubular jacket has a longitudinal extension, a second one of said corrugated subregions is provided centrally with respect to said longitudinal extension, and a third one of said corrugated subregions is provided on said fluid outlet side.

11. The honeycomb body configuration according to claim 4, wherein, for n>3, one of said corrugated subregions is predominantly provided on said fluid inlet side.

12. The honeycomb body configuration according to claim 4, wherein, for n>3, said inner tubular jacket has a longitudinal extension, and one of said corrugated subregions is provided centrally with respect to said longitudinal extension.

13. The honeycomb body configuration according to claim 4, wherein, for n>3, one of said corrugated subregions is predominantly provided on said fluid outlet side.

14. The honeycomb body configuration according to claim 4, wherein, for n>3, a first one of said corrugated subregions is provided on said fluid inlet side and a second one of said corrugated subregions is provided on said fluid outlet side.

15. The honeycomb body configuration according to claim 1, wherein:
   said inner tubular jacket has a longitudinal extension;
   said corrugated subregion is provided centrally with respect to said longitudinal extension; and
   said outer tubular jacket and said corrugated subregion are joined only at said first partial length.

16. The honeycomb body configuration according to claim 4, wherein:
   said inner tubular jacket has a longitudinal extension;
   one of said corrugated subregions is provided centrally with respect to said longitudinal extension and has a given length with a given partial length;
   said outer tubular jacket and said one of said corrugated subregions are joined only at said given partial length; and
   given ones of said smooth subregions are provided adjacent to said one of said corrugated subregions and have respective lengths with respective partial lengths, said given ones of said smooth subregions and said honeycomb body are joined at least at said respective partial lengths.

17. The honeycomb body configuration according to claim 4, wherein:
   said inner tubular jacket has a longitudinal extension;
   one of said corrugated subregions is provided centrally with respect to said longitudinal extension and has a given length with a given partial length;

said outer tubular jacket and said one of said corrugated subregions are joined only at said given partial length; and given ones of said smooth subregions are respectively provided at said inlet side and at said outlet side and have respective lengths with respective partial lengths, said given ones of said smooth subregions and said honeycomb body are joined at least at said respective partial lengths.

18. The honeycomb body configuration according to claim 1, wherein:

said inner tubular jacket has a longitudinal extension;

said corrugated subregion is provided at least predominantly decentralized with respect to said longitudinal extension; and said first partial length of said corrugated subregion and said outer tubular jacket are joined at one of said fluid inlet side and said fluid outlet side.

19. The honeycomb body configuration according to claim 4, wherein:

said inner tubular jacket has a longitudinal extension;

said corrugated subregions are provided at least predominantly decentralized with respect to said longitudinal extension; and respective partial lengths of said corrugated subregions and said outer tubular jacket are joined at at least one of said fluid inlet side and said fluid outlet side.

20. The honeycomb body configuration according to claim 4, wherein:

said inner tubular jacket has a longitudinal extension;

one of said corrugated subregions is provided at least predominantly decentralized with respect to said longitudinal extension;

said smooth subregions are provided at one of said fluid inlet side, said fluid outlet side and a central position along said longitudinal extension, respective partial lengths of said smooth subregions and said honeycomb body are joined; and a partial length of said one of said corrugated subregions and said outer tubular jacket are joined at one of said fluid inlet side and said fluid outlet side.

21. The honeycomb body configuration according to claim 4, wherein a sum of axial lengths of said corrugated subregions amounts to more than half of an overall length of said honeycomb body.

22. The honeycomb body configuration according to claim 4, wherein a sum of axial lengths of said corrugated subregions amounts to more than two thirds of an overall length of said honeycomb body.

23. The honeycomb body configuration according to claim 1, wherein said tubular corrugations, when viewed in an axial section, have steep flank regions.

24. The honeycomb body configuration according to claim 1, wherein said tubular corrugations, when viewed in an axial section, have omega-shaped flank regions.

25. The honeycomb body configuration according to claim 1, wherein said tubular corrugations have a flattened configuration, said flattened configuration is joined to said outer tubular jacket.

26. The honeycomb body configuration according to claim 1, wherein said first partial length of said corrugated subregion extends over 1 to 5 of said tubular corrugations.

27. The honeycomb body configuration according to claim 1, wherein said first partial length of said corrugated subregion extends over 2 to 4 of said tubular corrugations.

28. The honeycomb body configuration according to claim 1, wherein said first partial length of said corrugated subregion extends over three of said tubular corrugations.

29. The honeycomb body configuration according to claim 1, wherein:

said tubular corrugations include first tubular corrugations and second tubular corrugations;

said first tubular corrugations are at least partly joined with said outer tubular jacket, said second tubular corrugations are not joined with said outer tubular jacket; and a ratio of said first tubular corrugations to said second tubular corrugations is at most 1:1.5.

30. The honeycomb body configuration according to claim 1, wherein:

said tubular corrugations include first tubular corrugations and second tubular corrugations;

said first tubular corrugations are at least partly joined with said outer tubular jacket, said second tubular corrugations are not joined with said outer tubular jacket; and a ratio of said first tubular corrugations to said second tubular corrugations is 1:4.

31. The honeycomb body configuration according to claim 1, wherein said second partial length of said smooth subregion is dimensioned for a joining connection.

32. The honeycomb body configuration according to claim 1, wherein said second partial length of said smooth subregion is dimensioned for at least one joining connection selected from the group consisting of a brazed connection and a welded connection.

33. The honeycomb body configuration according to claim 1, wherein said smooth subregion is at least 15 mm long.

34. The honeycomb body configuration according to claim 1, wherein said smooth subregion is at least 20 mm long.

35. The honeycomb body configuration according to claim 1, wherein said smooth subregion is substantially 25 mm long.

36. The honeycomb body configuration according to claim 1, wherein said smooth subregion is provided on said fluid inlet side and is at least 5 mm long.

37. The honeycomb body configuration according to claim 1, wherein said smooth subregion is provided on said fluid inlet side and is at least 7.5 mm long.

38. The honeycomb body configuration according to claim 1, wherein said smooth subregion is provided on said fluid inlet side and is substantially 10 mm long.

39. The honeycomb body configuration according to claim 1, wherein said honeycomb body is a catalyst support structure defining an axial flow direction, and said honeycomb body has a given geometric shape.

40. The honeycomb body configuration according to claim 1, wherein said honeycomb body is a catalyst support structure defining an axial flow direction, and said honeycomb body is a cylindrical honeycomb body.

41. The honeycomb body configuration according to claim 1, wherein said honeycomb body is a catalyst support structure defining an axial flow direction, and said honeycomb body is a conical honeycomb body.

* * * * *